March 28, 1961
G. G. BRIXIUS ET AL
2,976,629
IDENTIFYING DEVICE
Filed April 30, 1959
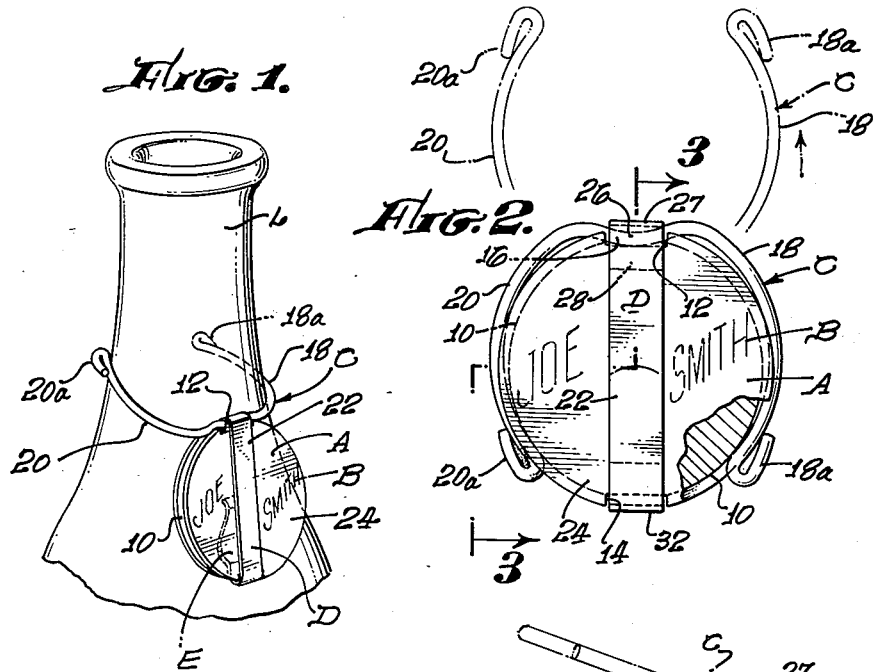
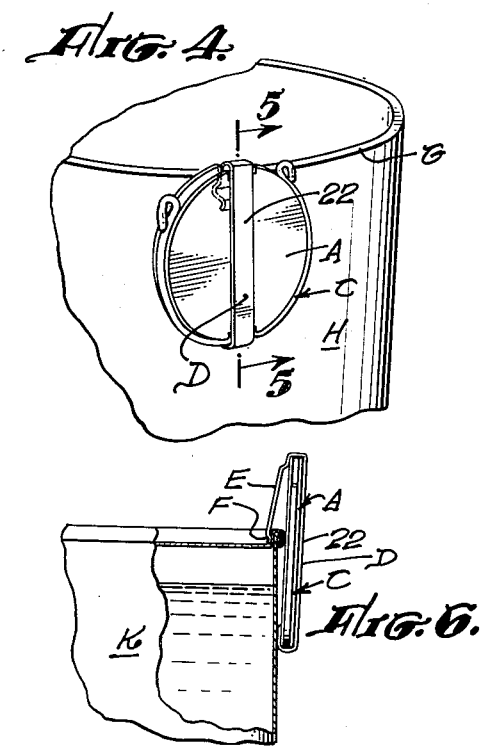
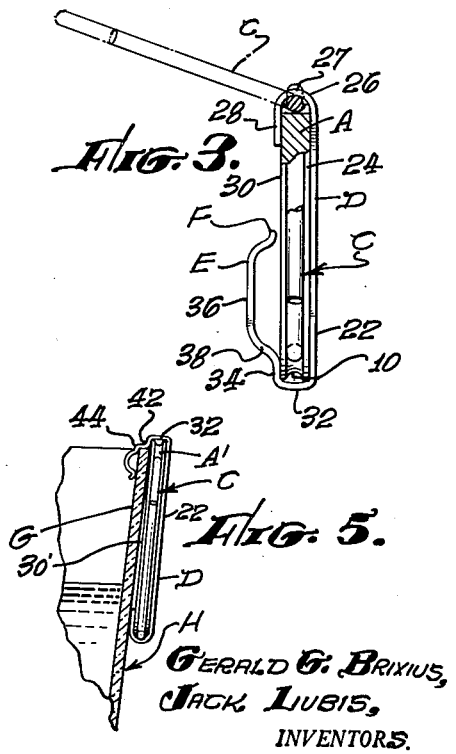
Gerald G. Brixius,
Jack Liubis,
INVENTORS.
BY William C. Babcock
ATTORNEY.

United States Patent Office 2,976,629
Patented Mar. 28, 1961

2,976,629
IDENTIFYING DEVICE
Gerald G. Brixius, 3522 Arabella St., and Jack Lubis, 3209 Woodruff, both of Long Beach, Calif.

Filed Apr. 30, 1959, Ser. No. 810,026

4 Claims. (Cl. 40—11)

The present invention relates generally to the field of owner or user identifying devices, and more particularly to a compact, lightweight and portable identifying device that may be removably affixed to a particular bottle, tumbler, or beer can.

In bowling alleys, particularly during team play and league competition, spectators and players alike are present in large numbers. On such occasions, as well as similar gatherings, beverages such as soft drinks, beer and the like are purchased by both spectators and players who are constantly moving about, and during consumption thereof often set their drinks down at the most convenient location with the intention of returning thereto. Due to the large number of drinks that may be temporarily deposited in a relatively restricted area, and the fact that the players and spectators move about during the period of play, confusion as to the ownership of the various drinks often arises.

A primary object of the present invention is to provide a drink identifying device that is compact, light in weight, is of a size to be easily carried in the pocket and the user's name or other identifying insignia may be written or otherwise marked thereon, which device is readily removably attachable to the neck of a bottle, the rim of a beer can, as well as a glass or tumbler to visually indicate the owner thereof.

Another object of the invention is to supply an identifying device of extremely simple structure, one that can be fabricated from standard commercially available materials without the use of elaborate plant facilities and can be retailed at a sufficiently low price as to encourage its widespread use.

A still further object of the invention is to furnish identifying devices that are susceptible to fabrication in various styles and color combinations, and as such provide considerable promotional advantage in popularizing a particular commercial product or service with which the color or style thereof is associated, irrespective of whether the devices are given away as as gesture of good will or are retailed in bowling alleys and other amusement centers for their intended purpose.

These and other objects and advantages of the invention will become apparent from the following description of a preferred and alternate forms thereof, and from the accompanying drawings illustrating those forms in which:

Figure 1 is a perspective view of a preferred form of the identifying device in an expanded form and removably affixed to the neck of a bottle to indicate the owner of the drink contained therein;

Figure 2 is an enlarged front elevational view of the device shown in Figure 1;

Figure 3 is a transverse cross-sectional view of the device taken on line 3—3 of Figure 2;

Figure 4 is a perspective view of an alternate form of the device removably mounted on a tumbler or glass;

Figure 5 is a transverse cross-sectional view of the alternate form of the identifying device shown in Figure 4 taken on line 5—5 thereof; and, Figure 6 is a transverse cross-sectional view of the preferred form of the invention shown removably attached to the rim of a beer can or other metallic beverage can.

Referring to Figures 1, 2 and 3 of the drawing for the general arrangement of the preferred form of the invention, it will be seen to include a rigid plate A capable of having the name B of the user marked thereon. A first engaging means C in the form of an arcuate wire is pivotally supported from plate A by a band D that extends transversely thereacross and is rigidly affixed thereto. The band D also serves a second function, for on the side of plate A opposite that on which the name B is marked, a portion of the band defines a second engaging means E in the form of a resilient leg that has a free end portion F which at all times tends to be adjacent the plate. Engaging means E, together with the surface of plate A opposite that on which the name B is marked, cooperatively grip the edge portion G of a glass or tumbler H (Figure 4) therebetween to removably support the invention therefrom. In Figure 6 it will be seen that the rim of a metallic container K such as a beer can, may also be removably engaged between engaging means E and plate A to support the invention therefrom.

Plate A, as best seen in Figures 1, 2 and 3, is preferably circular and of appreciable thickness. A circumferentially extending groove 10 is formed in the edge portion of plate A, and two diametrically opposed recesses 12 and 14 are also formed therein that extend diametrically inward from groove 10. The first engaging means C is formed of resilient wire that is bent or otherwise formed into a generally arcuate shape. This wire (Figure 2) has a straight central portion 16 that is aligned with recess 12. Two identical legs 18 and 20 project outwardly from portion 16 and bow upwardly slightly above the groove 10, but thereafter curve downwardly to partially encircle the perimeter of plate A. Due to the resiliency of the material from which they are fabricated and the configuration thereof, legs 18 and 20 grip portions of groove 10 when disposed in a common plane with plate A. End portions 18a and 20a of legs 18 and 20 respectively, are doubled over to loop back on the legs and provide smooth curved ends therefor which will not snag or otherwise damage one's clothing.

Band D is preferably formed from a strip of resilient metallic material which is slightly narrower than the width of recesses 12 and 14, and includes an elongate section 22 that extends diametrically across a first face 24 of plate A. A first end portion 26 of the band is bent to define a web 27 that extends across groove 10 slightly outwardly from plate A. The web then develops into a downwardly extending portion 28 that is crimped into pressure contact with a second face 30 of plate A (Figure 3). End portion 26 of band D, when formed into the web and extending portion 28 above described, cooperates with recess 16 to pivotally support the first engaging means C from plate A. When it is desired to affix the invention to the neck L of a bottle, engaging means C is simply manually sprung from groove 10 and pivoted to a position where it partially encircles the bottle neck as shown in Figure 1, with the plate A depending downwardly therefrom. After the invention has served its purpose in identifying a particular bottle, it is removed therefrom and engaging means C is pivoted relative to plate A to a position where it may be snapped into the groove gripping position shown in solid line in Figure 2. One of a number of positions that first engaging means C may occupy when pivoted relative to plate A is shown in phantom line in both Figures 2 and 3.

The lower end of band section 22 develops into a web 32 that extends transversely across the edge portion of plate A through second recess 14. Thereafter band D forms an upwardly extending portion 34 that is crimped against face 30 and then develops into the second engaging means E that is a resilient leg, laterally pivotal relative to plate A. This leg comprises a central elongate portion 36, the free partially curved end section F, and another curved end section 38 that blends into the band portion 34. Engaging means E, together with second face 30 of plate A, cooperatively permit the identifying device to removably grip an edge portion G of a glass H in the manner shown in Figure 4, or the rim of a beer can as illustrated in Figure 6.

Plate A may be formed from any one of a number of polymerized resins that are commercially available for this purpose, the physical characateristics of which are such as to receive writing or other indicia on the first face 24 thereof.

The alternate form of the invention shown in Figures 4 and 5 is identical to the preferred form thereof aside from the structure of the second engaging means E. Accordingly, the component parts of the alternate form that are identical to those in the preferred form are identified in the drawing by the same numerals, but to which a prime has been added.

In the alternate form of the invention the web 32 develops into a relatively short band portion 42 that on the outer end thereof and spaced away from second face 30' of plate A' in turn develops into a second engaging means E'. Second engaging means E' is in the form of a leg defined by a straight section 44 that terminates in a free curved end portion 46. In the alternate form of the device, engaging means E' serves the same function as engaging means E in the preferred form thereof as shown in Figures 4, 5 and 6.

The operation of the preferred and alternate forms of the invention have been described in conjunction with the structure thereof and hence need not be repeated herein.

It will be obvious to those skilled in the art that various changes may be made in our invention without departing from the spirit and scope thereof, and therefore the invention is not limited by that which is shown in the drawing and described in the specification, but only as indicated in the appended claims.

We claim:

1. An identifying device capable of being removably affixed to the neck of a bottle, comprising: a substantially planar circular plate adapted to receive identifying indicia thereon; engaging means adapted to engage the neck of said bottle to support said plate therefrom, said engaging means being arcuate in configuration with an inside diameter mateable with the outside diameter of said plate, means for pivotally affixing said engaging means to said plate at a peripheral point thereon, said engaging means being pivotable from a first position substantially in the plane of said plate to a second position substantially transverse thereto, said affixing means defining a radially inwardly extending resilient leg juxtaposed to one surface of said plate and substantially parallel thereto.

2. An identifying device capable of being removably affixed to the neck of a bottle, comprising: a substantially planar circular plate adapted to receive identifying indicia thereon; engaging means adapted to engage the neck of said bottle to support said plate therefrom, said engaging means being arcuate in configuration with an inside diameter mateable with the outside diameter of said plate, means for pivotally affixing said engaging means to said plate at a peripheral point thereon, said engaging means being pivotable from a first position substantially in the plane of said plate to a second position substantially transverse thereto, said affixing means defining a radially inwardly extending resilient leg juxtaposed to one surface of said plate.

3. An identifying device capable of being removably affixed to the neck of a bottle, comprising: a substantially planar circular plate adapted to receive identifying indicia thereon; engaging means adapted to engage the neck of said bottle to support said plate therefrom, said engaging means being substantially circular in configuration with an inside diameter mateable with the outside diameter of said plate, means for affixing said engaging means to said plate at a peripheral point thereon, said engaging means being pivotable from a first position substantially in the plane of said plate to a second position substantially transverse thereto, said affixing means defining a radially inwardly extending resilient leg juxtaposed to one surface of said plate and substantially parallel thereto.

4. An identifying device capable of being removably affixed to the neck of a bottle, comprising: a substantially planar circular plate adapted to receive identifying indicia thereon; engaging means adapted to engage the neck of said bottle to support said plate therefrom, said engaging means being substantially circular in configuration with an inside diameter mateable with the outside diameter of said plate, means for affixing said engaging means to said plate at a peripheral point thereon, said engaging means being pivotable from a first position substantially in the plane of said plate to a second position substantially transverse thereto; and a radially inwardly extending resilient leg affixed to said device proximate said peripheral point.

References Cited in the file of this patent

UNITED STATES PATENTS

| | | |
|---|---|---|
| 1,940,254 | Hopp | Dec. 19, 1933 |
| 1,971,528 | Klebanow | Aug. 28, 1934 |